(12) United States Patent
Kim et al.

(10) Patent No.: US 11,936,409 B2
(45) Date of Patent: Mar. 19, 2024

(54) DATA TRANSMITTING AND RECEIVING DEVICE

(71) Applicant: SAMSUNG ELECTRONICS CO., LTD., Suwon-si (KR)

(72) Inventors: Chulwoo Kim, Seoul (KR); Jonghyuck Choi, Suwon-si (KR); Seungwoo Park, Seoul (KR); Hyun Woo Cho, Suwon-si (KR); Tae-Jin Kim, Hwaseong-si (KR); Jae Suk Yu, Seoul (KR); Kil Hoon Lee, Seoul (KR); Young Hwan Chang, Yongin-si (KR)

(73) Assignees: Samsung Electronics Co., Ltd. (KR); Korea University Research and Business Foundation (KR)

( * ) Notice: Subject to any disclaimer, the term of this patent is extended or adjusted under 35 U.S.C. 154(b) by 0 days.

(21) Appl. No.: 17/683,476

(22) Filed: Mar. 1, 2022

(65) Prior Publication Data

US 2023/0026005 A1 Jan. 26, 2023

(30) Foreign Application Priority Data

Jul. 21, 2021 (KR) .................. 10-2021-0095707

(51) Int. Cl.
*H04B 1/04* (2006.01)
*H04L 25/03* (2006.01)
(52) U.S. Cl.
CPC ......... *H04B 1/04* (2013.01); *H04L 25/03057* (2013.01)

(58) Field of Classification Search
CPC .................. H04B 1/04; H04L 25/03057
See application file for complete search history.

(56) References Cited

U.S. PATENT DOCUMENTS

| 8,314,763 | B2 | 11/2012 | Park et al. |
| 9,225,561 | B2 | 12/2015 | Kizer et al. |
| 10,033,519 | B2 | 7/2018 | Duan et al. |
| 10,177,903 | B1 | 1/2019 | Toi |
| 10,615,956 | B2 | 4/2020 | Kobayashi et al. |
| 10,728,058 | B2 | 7/2020 | Sakai |
| 10,897,382 | B2 | 1/2021 | Kim et al. |
| 2006/0165204 | A1* | 7/2006 | Shumarayev ......... H04L 7/0083 375/376 |
| 2019/0007141 | A1* | 1/2019 | Kawata ................. H01S 5/0427 |

FOREIGN PATENT DOCUMENTS

KR 10-2019-0033195 A 3/2019

* cited by examiner

*Primary Examiner* — Janice N Tieu
(74) *Attorney, Agent, or Firm* — Fish & Richardson P.C.

(57) ABSTRACT

A transmitter and a receiver are provided. The transmitter includes a processing unit configured to receive a clock signal and a data signal, set a value of a consecutive identical digit (CID) value related to the data signal and generate a modulation signal during a unit interval (UI) based on the data signal and the CID value, and a transmitter driver configured to output output signals having different voltage levels during the unit interval by receiving the modulation signal.

20 Claims, 25 Drawing Sheets

FIG. 6

| $D_P$ | $D_N$ | $TX_P$ | $TX_N$ |
|---|---|---|---|
| OFF | OFF | Not happen | |
| OFF | ON | Low | High |
| ON | OFF | High | Low |
| ON | ON | Mid | Mid |

FIG. 8

| $IN_H$ | $IN_L$ | $IN_M$ | $TX_P$ | $TX_N$ |
|---|---|---|---|---|
| OFF | OFF | ON | Mid | Mid |
| OFF | ON | OFF | Low | High |
| ON | OFF | OFF | High | Low |
| Else | | | Not happen | |

Single-reference comparator (a)          (b)

FIG. 19

| Vout_P | Vout_N | Output_samp | Demodulator |
|--------|--------|-------------|-------------|
| High   | Low    | 11          | High        |
| Mid    | Mid    | 01          | Previous Output_samp |
| Low    | High   | 00          | Low         |

DATA TRANSMITTING AND RECEIVING DEVICE

CROSS-REFERENCE TO RELATED APPLICATION

This application claims priority from Korean Patent Application No. 10-2021-0095707, filed on Jul. 21, 2021, in the Korean Intellectual Property Office and all the benefits accruing therefrom under 35 U.S.C. 119, the contents of which in its entirety are herein incorporated by reference.

BACKGROUND

1. Field

Embodiments relate to a data transmitting and receiving device.

2. Description of the Related Art

For data communication, an NRZ (PAM-2) (NRZ is non-return to zero; PAM is pulse amplitude modulation) signaling method may be used. In this case, the NRZ (PAM-2) signaling method has two types of data modulation levels, and may simplify a structure of a transceiver.

SUMMARY

According to an embodiment, there is provided a transmitter, including a processing unit configured to receive a clock signal and a data signal, set a value of a consecutive identical digit (CID) value related to the data signal and generate a modulation signal during a unit interval (UI) based on the data signal and the CID value, and a transmitter driver configured to output output signals having different voltage levels during the unit interval by receiving the modulation signal.

According to another embodiment, there is provided a receiver, including an input unit configured to receive and amplify input signals having different voltage levels during a unit interval (UI) generated based on a consecutive identical digit (CID) value set by a transmitter to output recovery voltages, and a clock-data recovery (CDR) unit configured to receive the recovery voltages to recover a clock signal and a data signal, wherein the clock-data recovery unit includes, a decision feedback equalizer (DFE), and a clock network configured to provide an internal operating clock to the decision feedback equalizer, and the decision feedback equalizer includes, an amplifier configured to amplify amplitude of output voltages based on the recovery voltages, and an adder connected to an output node of the amplifier to receive charges stored in the amplifier, compensating for a channel loss of the output voltages of the output node.

According to another embodiment, there is provided a receiver, including an input unit configured to receive and amplify input signals having different voltage levels during a unit interval (UI) generated based on a consecutive identical digit (CID) value set by a transmitter to output recovery voltages, and a clock-data recovery (CDR) unit configured to receive the recovery voltages to recover a clock signal and a data signal, wherein the clock-data recovery unit includes, a data decision feedback equalizer (Data DFE), an edge decision feedback equalizer (Edge DFE), a reference sampler, a sampler, and a phase detector (PD), wherein the sampler is configured to compare an output of the data decision feedback equalizer with an output of the reference sampler to output a comparison value and provide the comparison value to the phase detector, the edge decision feedback equalizer is configured to output an output voltage for identifying an intersection point of voltage level transition to provide the output voltage to the phase detector, and the phase detector is configured to output phase information by adjusting a position of the intersection point based on the comparison value and the output voltage.

Other features and embodiments may be apparent from the following detailed description, the drawings and the claims.

BRIEF DESCRIPTION OF THE DRAWINGS

Features will become apparent to those of skill in the art by describing in detail example embodiments with reference to the attached drawings in which:

FIG. 6 is a truth table related to the transmitter driver and the modulation signal of FIG. 3 for data signal modulation according to an example embodiment.

FIG. 8 is a truth table related to the transmitter driver and modulation signal of FIG. 7 for data signal modulation according to another example embodiment.

FIG. 14 is a diagram illustrating an output voltage amplification principle of an amplifier.

FIG. 19 is an example table illustrating a method of demodulating a data signal in a demodulator by using a comparison value of a sampler.

DETAILED DESCRIPTION

Figure 1:
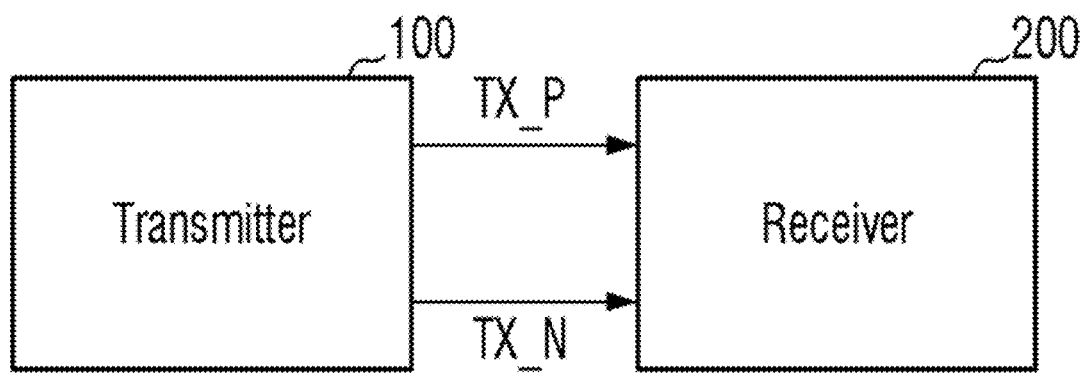
FIG. 1 is a conceptual block diagram illustrating a data transceiving system according to some example embodiments.
Figure 2A:
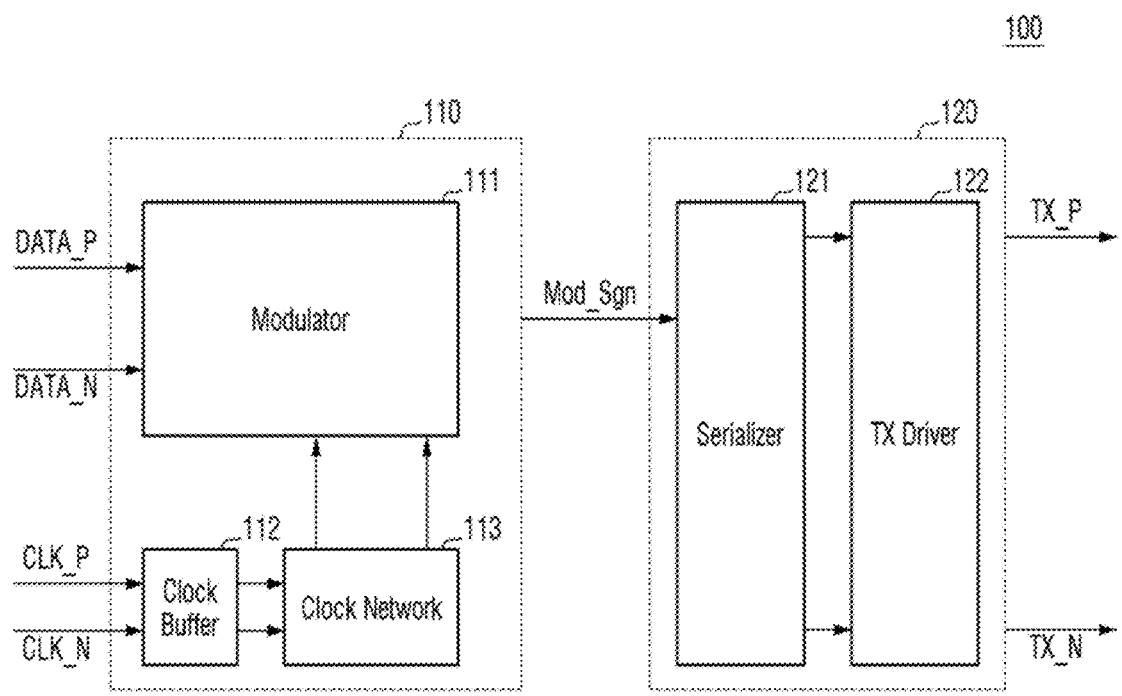
FIGS. 2a and 2b are conceptual block diagrams of a transmitter according to some example embodiments of FIG. 1.
Figure 9:
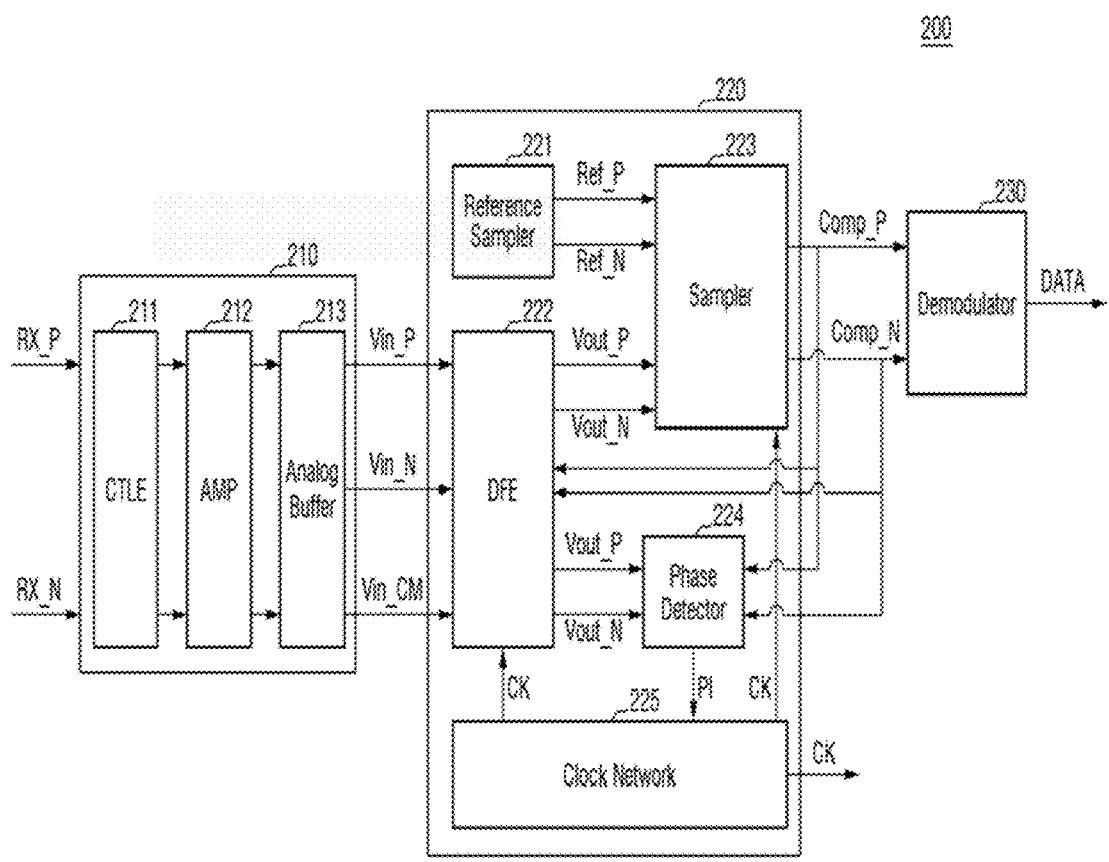
FIG. 9 is a conceptual block diagram illustrating a receiver according to some example embodiments of FIG. 1.

FIG. 1 is a conceptual block diagram illustrating a data transceiving system according to some example embodiments, FIGS. 2a and 2a are conceptual block diagrams of a transmitter according to some example embodiments of FIG. 1, and FIG. 9 is a conceptual block diagram of a receiver according to some example embodiments of FIG. 1.

Referring to FIG. 1, a data transceiving system 1 may include a transmitter 100 and a receiver 200.

The transmitter 100 may transmit output signals TX_P and TX_N to the receiver 200. In some example embodiments, the output signals TX_P and TX_N may be transmitted to the receiver 200 in the form of a differential signal pair. Further, in some other example embodiments, these output signals TX_P and TX_N may be transmitted to the receiver 200 in the form of a single-ended signal, unlike the illustrated embodiment. The output signals TX_P and TX_N may be transmitted to the receiver 200 via a random channel.

Referring to FIG. 2, the transmitter 100 may include a processing unit 110 and an output unit 120.

The processing unit 110 may include a modulator 111, a clock buffer 112 and a clock network 113.

The output unit 120 may include a serializer 121 and a transmitter driver 122 (TX driver).

The clock buffer 112 may receive clock signals CLK_P and CLK_N from the outside. The clock buffer 112 may remove noise generated during transmission and input processes of the clock signals CLK_P and CLK_N, and may amplify magnitudes of the clock signals CLK_P and CLK_N and then provide the amplified signals to the clock network 113.

The clock network 113 may synchronize the clock signals provided from the clock buffer 112 to have the same phase. The clock network 113 may transmit the synchronized clock signals to an element (e.g., modulator 111), which requires the clock signals, in the processing unit 110.

The modulator 111 may receive data signals DATA_P and DATA_N from the outside. The modulator 111 may receive clock signals from the clock network 113. The modulator 111 may generate a modulation signal Mod_Sgn by using the received data signals DATA_P and DATA_N and the received clock signals CLK_P and CLK_N. In addition, the modulator 111 may set a consecutive identical digit (CID) value, which is the number of times that the same data signal is repeated, in the process of generating the modulation signal Mod_Sgn. The modulator 111 may transmit the modulation signal Mod_Sgn to the serializer 121.

The serializer 121 may be present for a high-speed transmission design inside the transmitter 100. In some example embodiments, the transmitter 100 may not include a serializer 121 when the modulator 111 is capable of performing high-speed transmission of data sufficiently. In this case, the modulation signal Mod_Sgn may be transmitted directly from the modulator 111 to the transmitter driver 122.

The transmitter driver 122 may output the output signals TX_P and TX_N, having different voltage levels in the form of a differential signal pair, by using the modulation signal Mod_Sgn and the CID value set by the modulator 111 in accordance with an internal structure.

Figure 2B:
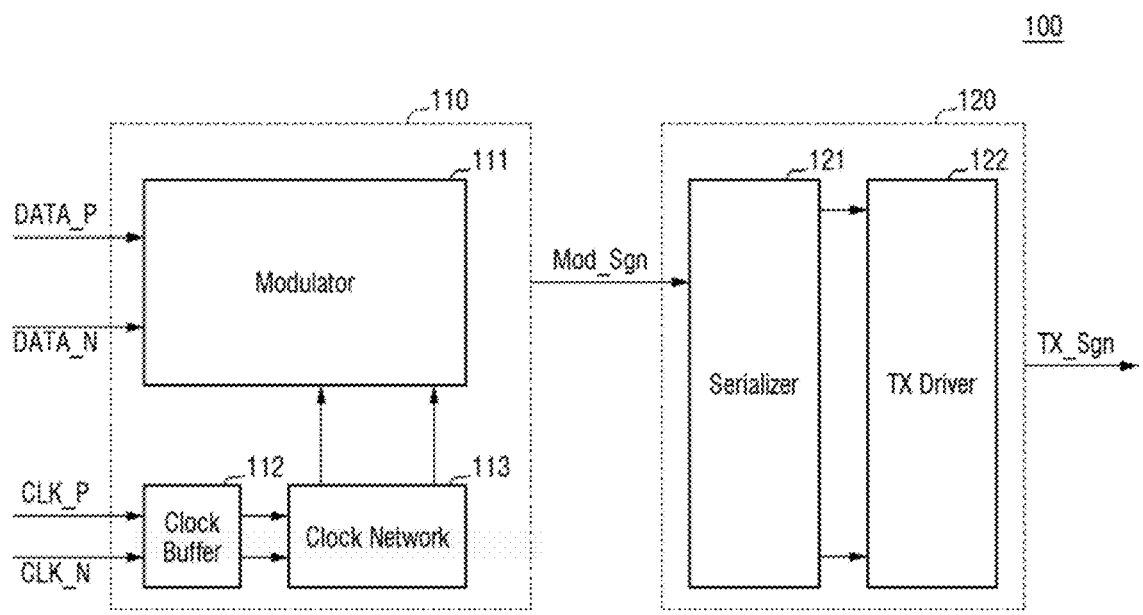

However, the embodiment is not limited to the above example. As shown in FIG. 2b, the transmitter driver 122 may output an output signal TX_Sgn having different voltage levels in the form of a single-ended signal by using the modulation signal Mod_Sgn and the CID value set by the modulator 111 in accordance with the internal structure.

Figure 3:
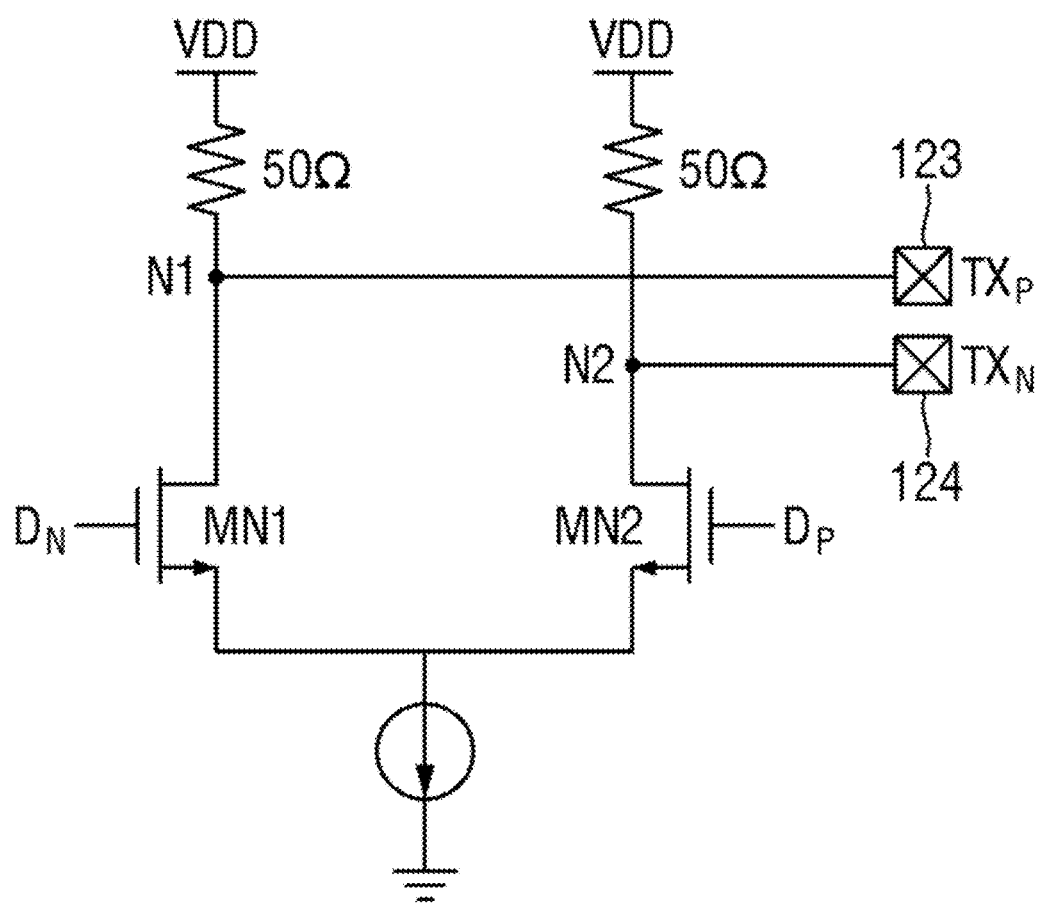
FIG. 3 is an example circuit diagram illustrating a structure of a transmitter driver according to an example embodiment.

FIG. 3 is an example circuit diagram illustrating a structure of a transmitter driver according to an example embodiment.

Referring to FIG. 3, the transmitter driver 122 may include a first output terminal 123, a second output terminal 124, a first transistor MN1 and a second transistor MN2.

The first output terminal 123 may be connected to a first node N1, and the second output terminal 124 may be connected to a second node N2.

The first transistor MN1 may be gated by a second modulation signal $D_N$, and the second transistor MN2 may be gated by a first modulation signal $D_P$.

A voltage, in which a voltage drop caused by a current flowing to the first transistor MN1 occurs, may be applied from a driving voltage VDD to the first node N1 in accordance with the second modulation signal $D_N$.

A voltage, in which a voltage drop caused by a current flowing to the second transistor MN2 occurs, may be applied from the driving voltage VDD to the second node N2 in accordance with the first modulation signal $D_P$.

Figure 4:
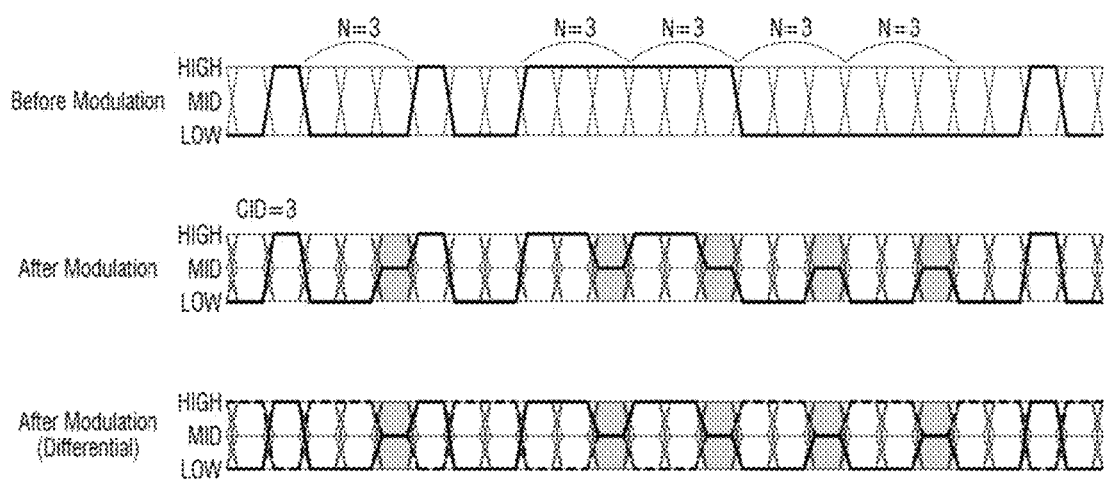
FIG. 4 is a diagram illustrating a data signal modulation method based on a CID value of a transmitter according to an example embodiment.

FIG. 4 is a diagram illustrating a data signal modulation method based on a CID value of a transmitter according to an example embodiment.

Referring to FIG. 4, a voltage level of an output signal may include a high level, a mid level, and a low Level.

When the CID value is 3 and the same data signal is repeated three times, the modulator 111 may generate a modulation signal Mod_Sgn to allow the transmitter driver 122 to generate an output signal of a mid level from the third data signal. The transmitter driver 122 that has received the modulation signal Mod_Sgn may output an output signal of a mid level corresponding to the received modulation signal Mod_Sgn.

Figure 5:
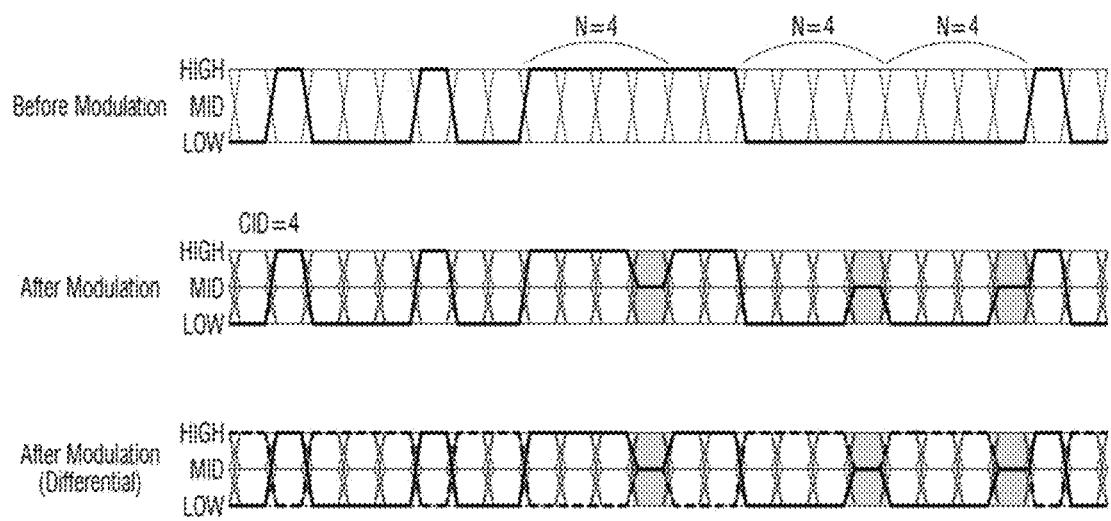
FIG. 5 is a diagram illustrating a data signal modulation method based on a CID value of a transmitter according to another example embodiment.

FIG. 5 is a diagram illustrating a data signal modulation method based on a CID value of a transmitter according to another example embodiment.

Unlike FIG. 4, the modulator 111 may set the CID value to 4. Therefore, when the same data signal is repeated four times, the modulator 111 may generate a modulation signal Mod_Sgn from the fourth data signal to allow the transmitter driver 122 to generate an output signal of a mid level.

As described above, the modulator may set the CID value, and the transmitter driver may output the output signal of the mid level by using the CID value and the modulation signal, whereby a data transition density may randomly or readily be adjusted in accordance with a channel or performance of the receiver, and the data signal corresponding to the output signal of the mid level may be checked exactly. Therefore, reliable 3-level signaling communication may be performed.

FIG. 6 is a truth table related to the transmitter driver and the modulation signal of FIG. 3 for data signal modulation according to an example embodiment.

Referring to FIGS. 3 and 6, the modulation signal Mod_Sgn may include a first modulation signal $D_P$ and a second modulation signal $D_N$.

The modulation signal Mod_Sgn may have a value of ON or OFF.

When a value of the first modulation signal $D_P$ is OFF and a value of the second modulation signal $D_N$ is ON, a current flows to the first transistor MN1 to generate a voltage drop, whereby the first node N1 may have a voltage of a low level. Since no current flows to the second transistor MN2, a voltage drop is not generated, whereby the second node N2 may have a voltage of a high level. Therefore, the first output terminal 123 may output an output signal of a low level, and the second output terminal 124 may output an output signal of a high level.

When the value of the first modulation signal $D_P$ is ON and the value of the second modulation signal $D_N$ is OFF, no current flows to the first transistor MN1 so as not to generate a voltage drop, whereby the first node N1 may have a voltage of a high level. Since a current flows to the second transistor MN2 to generate a voltage drop, the second node N2 may have a voltage of a low level. Therefore, the first output terminal 123 may output an output signal of a high level, and the second output terminal 124 may output an output signal of a low level.

When the value of the first modulation signal $D_P$ is ON and the value of the second modulation signal $D_N$ is ON, a current of a magnitude smaller than that of a current flowing to any one of the first transistor MN1 and the second transistor MN2 may flow to the first transistor MN1 and the second transistor MN2 to generate a voltage drop. Therefore, both the voltage of the first node N1 and the voltage of the second node N2 may have a mid level. As a result, both the first output terminal 123 and the second output terminal 124 may output an output signal of a mid level.

However, the present disclosure is not limited to above example, and the transmitter driver 122 may be implemented to output an output signal in the form of a single-ended signal through modification like that of the transmitter driver 122 including only one of the first output terminal 123 and the second output terminal 124.

Figure 7:
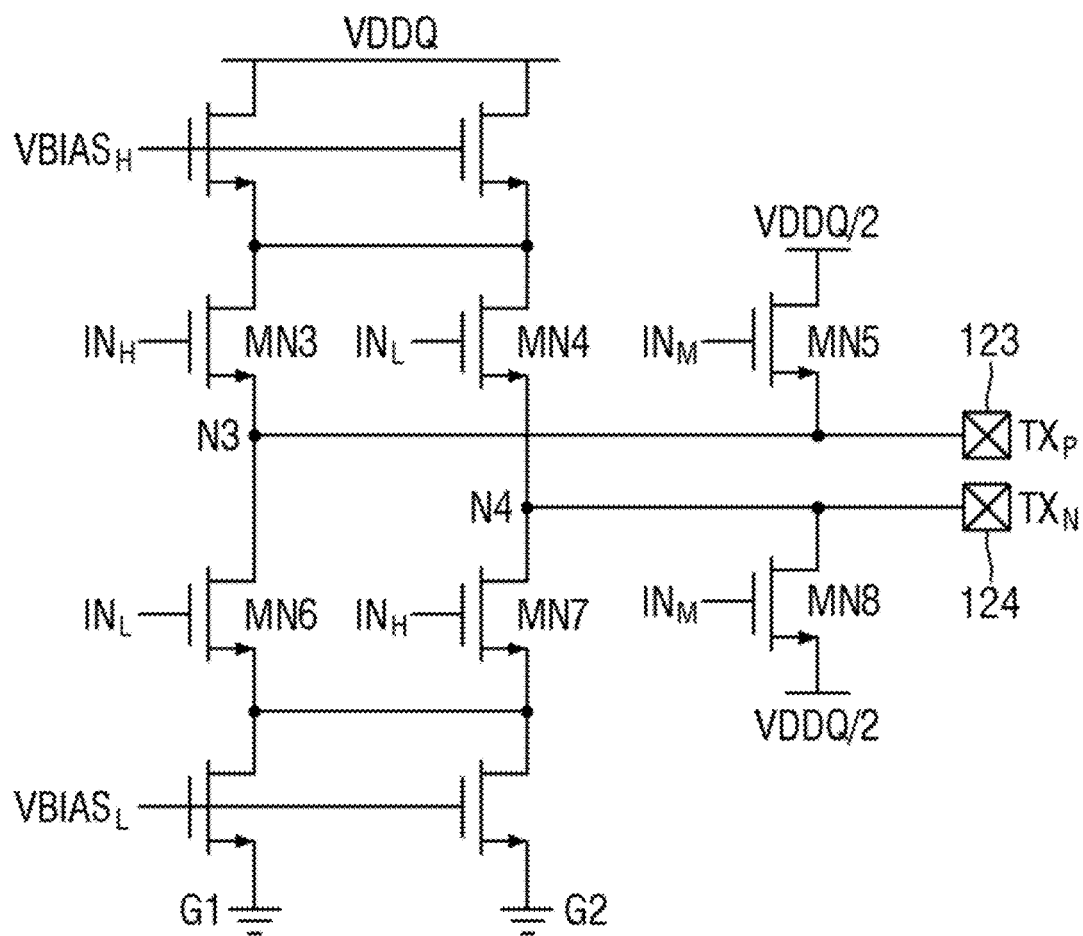
FIG. 7 is an example circuit diagram illustrating a structure of a transmitter driver according to another example embodiment.

FIG. 7 is an example circuit diagram illustrating a structure of a transmitter driver according to another example embodiment.

Referring to FIG. 7, the transmitter driver 122 may include a first output terminal 123, a second output terminal 124, a third transistor MN3, a fourth transistor MN4, a fifth transistor MN5, a sixth transistor MN6, a seventh transistor MN7, and an eighth transistor MN8.

The first output terminal 123 may be connected to a third node N3. The second output terminal 124 may be connected to a fourth node N4.

The third transistor MN3 and the seventh transistor MN7 may be gated by a third modulation signal $IN_H$.

The fourth transistor MN4 and the sixth transistor MN6 may be gated by a fourth modulation signal $IN_L$.

The fifth transistor MN5 and the eighth transistor MN8 may be gated by a fifth modulation signal $IN_M$.

FIG. 8 is a truth table related to the transmitter driver and modulation signal of FIG. 7 for data signal modulation according to another example embodiment.

Referring to FIGS. 7 and 8, the modulation signal Mod_Sgn may include a third modulation signal $IN_H$, a fourth modulation signal $IN_L$, and a fifth modulation signal $IN_M$.

The modulation signal Mod_Sgn may have a value of ON or OFF.

When a value of the third modulation signal $IN_H$ is OFF, a value of the fourth modulation signal $IN_L$ is OFF and a value of the fifth modulation signal $IN_M$ is ON, the third node N3 may have a mid level by receiving a second driving voltage VDDQ/2 having a half magnitude of a first driving voltage VDDQ through the fifth transistor MN5. The fourth node N4 may have a mid level by receiving a second driving voltage VDDQ/2 having a half magnitude of the first driving voltage VDDQ through the eighth transistor MN8. Therefore, both the first output terminal 123 and the second output terminal 124 may output an output signal of a mid level.

When the value of the third modulation signal $IN_H$ is OFF, the value of the fourth modulation signal $IN_L$ is ON and the value of the fifth modulation signal $IN_M$ is OFF, the third node N3 may be connected to a first ground node G1 through the sixth transistor MN6 to have a low level. The fourth node N4 may have a high level by receiving the first driving voltage VDD1 through the fourth transistor MN4. Therefore, the first output terminal 123 may output an output signal of a low level, and the second output terminal 124 may output an output signal of a high level.

When the value of the third modulation signal $IN_H$ is ON, the value of the fourth modulation signal $IN_L$ is OFF and the value of the fifth modulation signal $IN_M$ is OFF, the third node N3 may have a high level by receiving the first driving voltage VDDQ through the third transistor MN3. The fourth node N4 may be connected to a second ground node G2 through the seventh transistor MN7 to have a low level. Therefore, the first output terminal 123 may output an output signal of a high level, and the second output terminal 124 may output an output signal of a low level.

However, the present disclosure is not limited to the above example, and the transmitter driver 122 may be implemented to output an output signal in the form of a single-ended signal through modification like that of the transmitter driver 122 including only one of the first output terminal 123 and the second output terminal 124.

Figure 10:
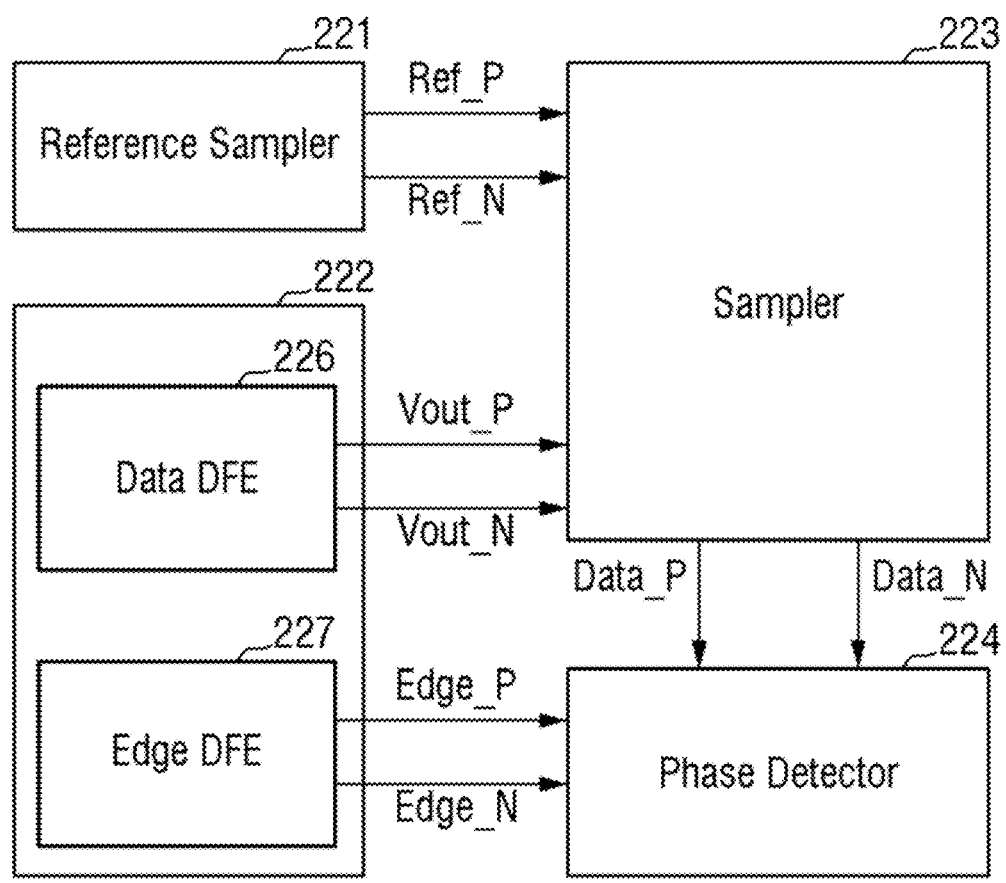
FIG. 10 is a conceptual block diagram illustrating a clock-data recovery unit according to some example embodiments.
Figure 11:
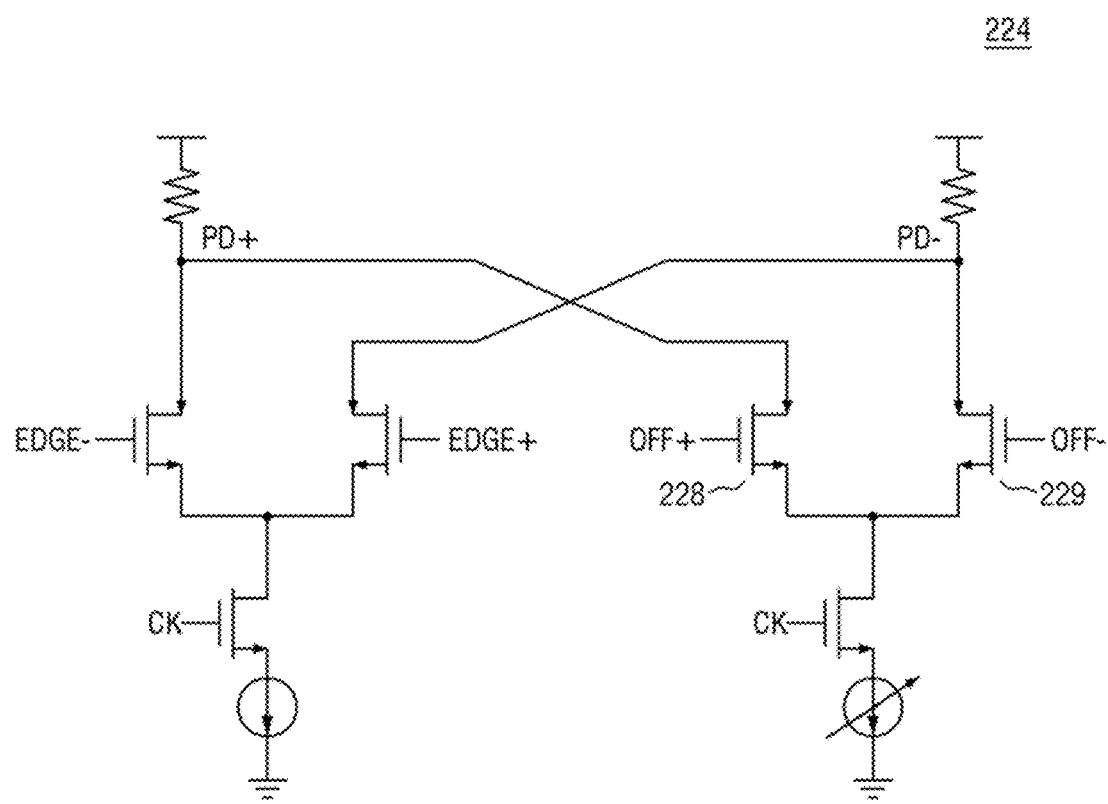
FIG. 11 is an example circuit diagram illustrating a structure of a phase detector according to an example embodiment.

FIG. 9 is a conceptual block diagram illustrating a receiver according to some example embodiments of FIG. 1, FIG. 10 is a conceptual block diagram illustrating a clock-data recovery unit according to some example embodiments, and FIG. 11 is an example circuit diagram illustrating a structure of a phase detector according to an example embodiment.

First, referring to FIG. 9, the receiver 200 may include an input unit 210, a clock-data recovery unit (CDR) 220, and a demodulator 230.

The input unit 210 may include a continuous time linear equalizer (CTLE) 211, an amplifier AMP 212, and an analog buffer 213.

The clock-data recovery unit 220 may include a reference sampler 221, a decision feedback equalizer (DFE) 222, a sampler 223, a phase detector (PD) 224, and a clock network 225.

The continuous time linear equalizer (CTLE) 211 may receive output signals RX_P and RX_N, remove a noise component such as inter-symbol interference (ISI) generated during a transmission process through a channel of the received output signals RX_P and RX_N, amplify a high-frequency component, and then provide the amplified high-frequency component to the amplifier (AMP) 212.

Although FIG. 9 shows the output signals RX_P and RX_N of the transmitter in the form of a differential pair, when the output signal is output from the transmitter in the form of a single-ended signal as shown in FIG. 2b, the continuous time linear equalizer (CTLE) 211 may receive the output signal in the form of a single-ended signal.

The amplifier (AMP) 212 may amplify the magnitude of the received signal, to provide the amplified signal to the analog buffer 213.

For example, the analog buffer 213 may include a buffer having a gain of 1, and may provide the amplified signal to the decision feedback equalizer 222 as recovery voltages $V_{IN\_P}$, $V_{IN\_N}$, and $V_{IN\_CM}$ that are common voltages corresponding to common signals of a differential pair voltage and a differential pair signal. In some example embodiments, the analog buffer 213 may include two or more, depending on an inner configuration of the decision feedback equalizer 222.

The decision feedback equalizer 222 may include an amplifier for amplifying the amplitude of the output voltage according to the recovery voltage, and an adder supplied with charges stored in the amplifier.

The decision feedback equalizer may provide output voltages $V_{OUT}\_P$ and $V_{OUT}\_N$ to the sampler 223 and the phase detector 224 by receiving the recovery voltages $V_{IN}\_P$, $V_{IN}\_N$ and $V_{IN}\_CM$ from the analog buffer 213, and outputting the output voltages $V_{OUT}\_P$ and $V_{OUT}\_N$. The decision feedback equalizer 222 may output the output voltages $V_{OUT}\_P$ and $V_{OUT}\_N$ by compensating for a channel loss generated in the transmission process through a channel of the output signals RX_P and RX_N output from the transmitter.

The reference sampler 221 may provide the sampler 223 with reference voltages Ref P and Ref N, to allow the sampler 223 to compare the reference voltages Ref P and Ref N with the output voltages $V_{OUT}\_P$ and $V_{OUT}\_N$ output from the decision feedback equalizer 222 in terms of magnitudes. The reference sampler 221 may be supplied with an external power source to output the reference voltages Ref_P and Ref_N.

The sampler 223 may output comparison values Comp_P and Comp_N by comparing the output voltages $V_{OUT}\_P$ and $V_{OUT}\_N$ with the reference voltages Ref_P and Ref_N. The comparison values Comp_P and Comp_N may be provided to the decision feedback equalizer 222, the phase detector 224, and the demodulator 230.

The phase detector 224 may output phase information PI based on the output voltages $V_{OUT}\_P$ and $V_{OUT}\_N$ from the decision feedback equalizer 222 and the comparison values Comp_P and Comp_N from the sampler 223. The phase detector 224 may provide the phase information PI to the clock network 225.

The clock network 225 may receive the phase information PI from the phase detector 224. The clock network 225 may include a voltage controlled oscillator (VCO) that generates a new internal operating clock CK that is frequency-adjusted based on the phase information PI. The clock network 225 may provide the generated internal operating clock CK to the decision feedback equalizer 222 and the sampler 223.

The phase detector 224 will be described in detail below with reference to FIGS. 10 and 11.

The decision feedback equalizer 222 may include a data decision feedback equalizer (DFE) 226 and an edge decision feedback equalizer (DFE) 227. Correspondingly, the analog buffer 213 may include two, and may provide the data decision feedback equalizer 226 and the edge decision feedback equalizer 227 with the recovery voltages $V_{IN}\_P$, $V_{IN}\_N$ and $V_{IN}$ CM.

The data decision feedback equalizer 226 may provide the sampler 223 with the output voltages $V_{OUT}\_P$ and $V_{OUT}\_N$, to determine voltage levels of the output signals RX_P and RX_N received from the transmitter.

The edge decision feedback equalizer 227 may provide the phase detector 224 with output voltages Edge_P and Edge_N, for identifying a position of an intersection point based on voltage level transition of the output signals RX_P and RX_N by outputting the output voltages Edge_P and Edge_N.

Referring to FIG. 11, the phase detector 224 may adjust the position of the intersection point generated in accordance with the voltage level transition.

For example, the phase detector 224 may include an offset switch that includes a first offset switch 228 and a second offset switch 229. The offset switch may correct the output voltages Edge_P and Edge_N such that the intersection point based on the voltage level transition of the output voltage is positioned at the center.

A detailed operation of the phase detector 224 will be described below.

Figure 12:
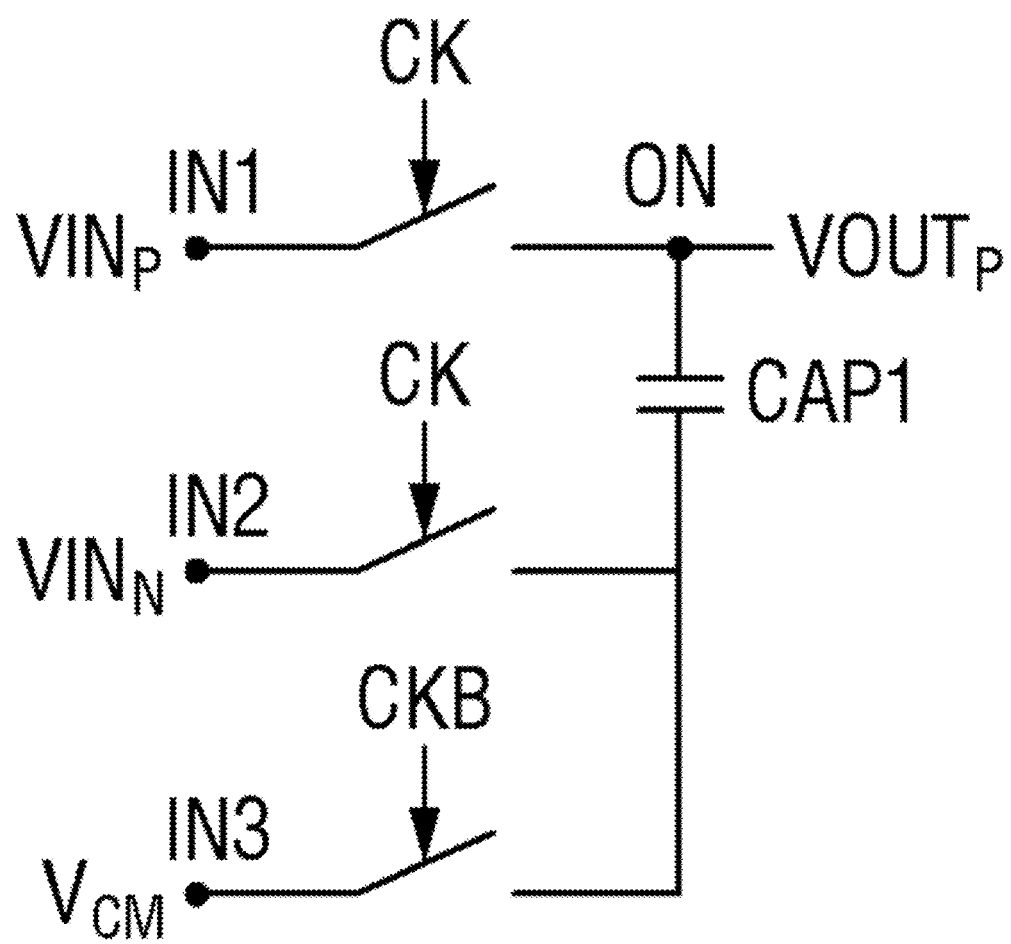
FIG. 12 is an example circuit diagram illustrating a structure of an amplifier inside a decision feedback equalizer.

FIG. 12 is an example circuit diagram illustrating a structure of an amplifier inside a decision feedback equalizer.

Referring to FIG. 12, the amplifier may include a first capacitor CAP1.

One end of the first capacitor CAP1 may be connected to an output node ON. Also, one end of the first capacitor CAP1 may be connected to a first input node IN1 in accordance with an internal operating clock level to receive any one $VIN_P$ of a differential pair of the recovery voltages. The other end of the first capacitor CAP1 may be connected to a second input node IN2 in accordance with the internal operating clock level to receive the other one $VIN_N$ of the differential pair of the recovery voltages, or may be connected to a third input node IN3 in accordance with the internal operating clock to receive a common voltage $V_{CM}$. In this case, the internal operating clock may perform transition between a first clock level CK and a second clock level CKB.

Figure 13:
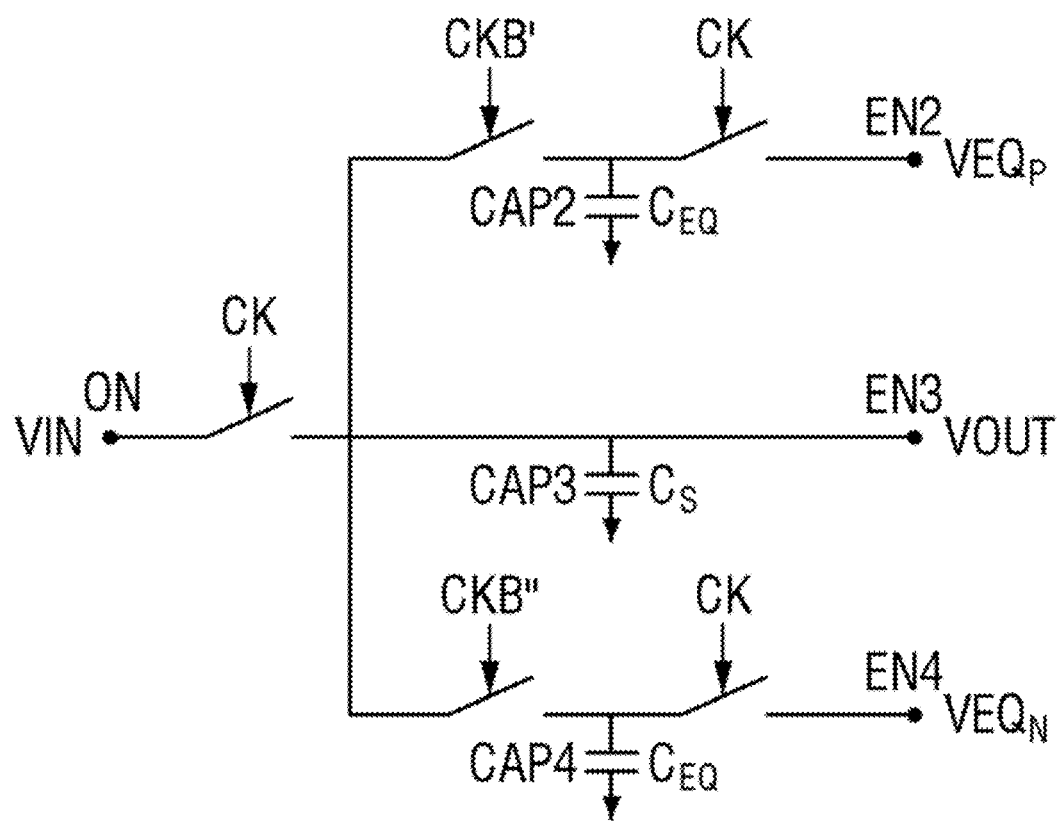
FIG. 13 is an example circuit diagram illustrating a structure of an adder inside a decision feedback equalizer.

FIG. 13 is an example circuit diagram illustrating a structure of an adder inside a decision feedback equalizer.

Referring to FIG. 13, the adder may include second to fourth capacitors CAP2, CAP3, and CAP4.

Any one of one ends of the second to fourth capacitors CAP2, CAP3, and CAP4 may be connected to an output node ON in accordance with the internal operating clock level. The other ends of the second to fourth capacitors CAP2, CAP3, and CAP4 may be connected to second to fourth compensation nodes EN2, EN3, and EN4, respectively, in accordance with the internal operating clock level to receive a voltage of each node. In this case, second and fourth compensation voltages $VEQ_P$ and $VEQ_N$ may have a value determined by a length, transmission speed, etc., of a channel in the process of transmitting a signal from the transmitter to the receiver, and may be a voltage supplied through a random power source. The internal operating clock may perform transition between the first clock level CK and the second clock level CKB.

Referring to FIGS. 12 and 13, the adder in FIG. 12 may further include an amplifier for receiving recovery voltages of a differential pair opposite to each other in the first input node IN1 and the second input node IN2, and may further include an adder connected to the amplifier. Thus, the adder may include two pairs of amplifiers for receiving the recovery voltages of the differential pair, which are opposite to each other in the first and second input nodes IN1 and IN2, and two pairs of adders respectively connected to the two pairs of amplifiers. Therefore, the output voltages $V_{OUT}\_P$ and $V_{OUT}\_N$ in the output node ON may be output in the form of a differential pair.

Figure 14:
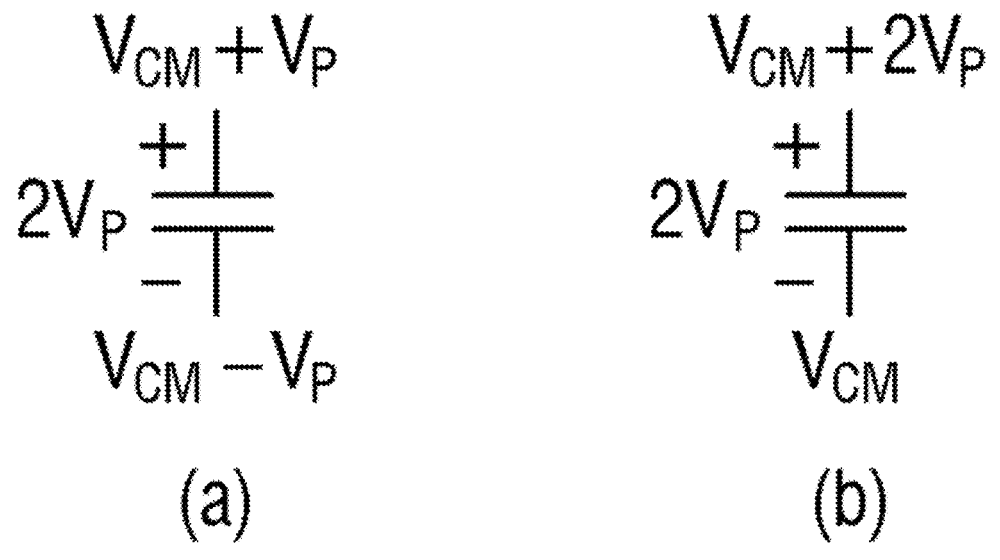

FIG. 14 is a diagram illustrating an output voltage amplification principle of an amplifier.

Referring to (a) of FIG. 14, a first voltage $V_{CM}+V_P$ is input to one end of a capacitor, e.g., a random capacitor, and a second voltage $V_{CM}-V_P$ is input to the other end of the capacitor, e.g., the random capacitor. At this time, the first voltage may correspond to any one $VIN_P$ of the differential pair of the recovery voltages in FIG. 12, and the second voltage may correspond to the other one $VIN_N$ of the differential pair of the recovery voltages in FIG. 12. $V_{CM}$ may be a common voltage, and $V_P$ may be the amplitude of a swing voltage.

Referring to (b) of FIG. 14, when the common voltage $V_{CM}$ is input to the other end of the random capacitor, the first voltage input to one end of the capacitor may become twice in the amplitude of the swing voltage by charge preservation properties of the capacitor.

Referring back to FIG. 13, when the internal operating clock is the first clock level CK, the amount of charges $Q_S$ stored in the third capacitor CAP3, the amount of charges $Q_{EQ}$ stored in the second to fourth capacitors CAP2, CAP3, and CAP4 and the magnitude of the output voltage $V_{OUT}$ are given in Equations 1 to 3 below.

$$Q_S = C_S \times VIN = C_S \times (V_{CM} \pm V_P) \quad \text{[Equation 1]}$$

$$Q_{ZO} = C_{EO} \times VEQ_{P,N} = C_{EQ} \times (V_{CM} \pm V_{EO}) \quad \text{[Equation 2]}$$

$$VOUT = VIN = V_{CM} \pm V_P \quad \text{[Equation 3]}$$

In this case, an equalizer voltage $V_{EQ}$ may be a value determined by the length, transmission speed, etc., of the channel in the process of transmitting a signal from the transmitter to the receiver.

In FIG. 13, when the internal operating clock is the second clock level CKB, only one of the second capacitor CAP2 and the fourth capacitor CAP4 may be connected to the third capacitor CAP3. Therefore, a sum $Q_{SUM}$ of the charge amount of the third capacitor CAP3 and the charge amount of any one of the second and fourth capacitors CAP2 and CAP4 connected with the third capacitor CAP3 and a magnitude of an output voltage VOUT' are given in Equations 4 and 5 below.

$$Q_{SUM} = Q_S + Q_{EQ} = (C_S \pm C_{EQ}) \times VOUT' \quad \text{[Equation 4]}$$

$$VOUT' = \frac{C_S \times (V_{CM} \pm V_p) + C_{EQ} \times (V_{CM} \pm V_{EQ})}{C_S + C_{EQ}} = V_{CM} + \frac{C_S \times V_p \pm C_{EQ} \times V_{EQ}}{C_S + C_{EQ}} \quad \text{[Equation 5]}$$

In this case, when capacitance values of the second capacitor CAP2 and the fourth capacitor CAP4 are equal to a capacitance value of the third capacitor CAP3, the magnitude of the output voltage VOUT' is given in Equation 6 below.

$$VOUT' = V_{CM} + \frac{V_p \pm V_{EQ}}{2} \quad \text{[Equation 6]}$$

Therefore, since the gain of the amplifier becomes twice and the gain of the adder becomes 0.5 times, the gain of the decision feedback equalizer may be one time, whereby the magnitude of the signal may be maintained.

Figure 15:
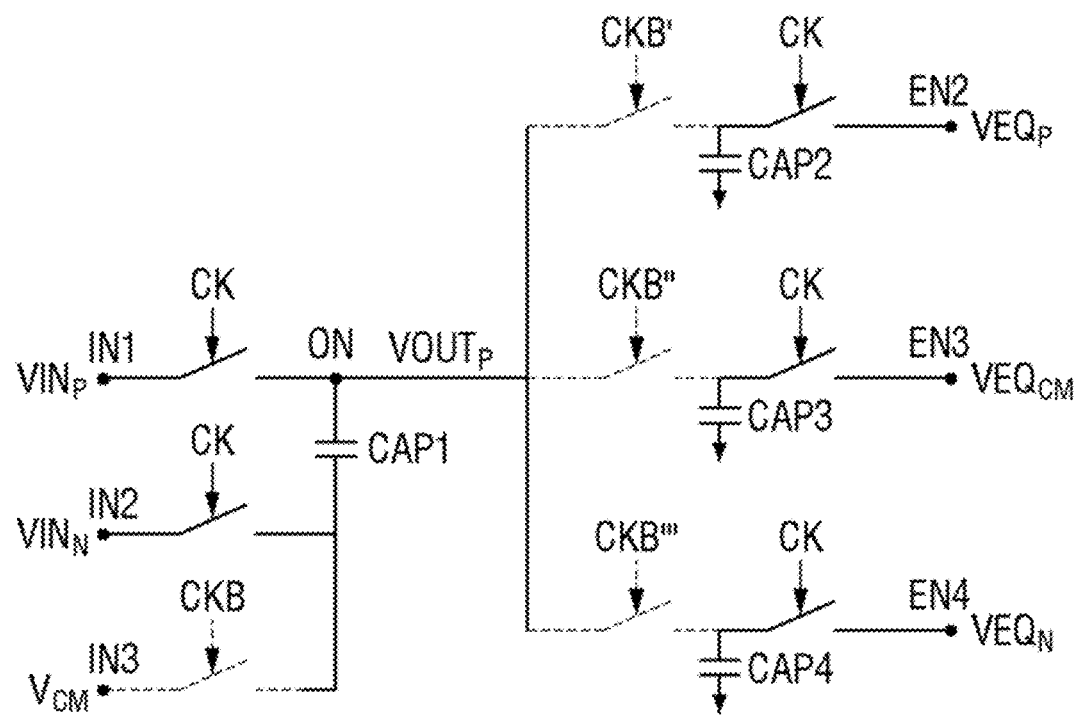
FIG. 15 is an example circuit diagram illustrating a sampling operation of an amplifier and an adder.

FIG. 15 is an example circuit diagram illustrating a sampling operation of an amplifier and an adder.

Referring to FIG. 15, when the internal operating clock is the first clock level CK, one end of the first capacitor CAP1 of the amplifier is connected to the first input node IN1 to receive any one $VIN_P$ of the differential pair of the recovery voltages, and the other end of the first capacitor CAP1 is connected to the second input node IN2 to receive the other one $VIN_N$ of the differential pair of the recovered voltages, whereby the first capacitor CAP1 may store charges based on the recovery voltages $VIN_P$ and $VIN_N$.

Also, one ends of the second to fourth capacitors CAP2, CAP3, and CAP4 of the adder are all opened so as not to be connected to the output node ON, the other end of the second capacitor CAP2 is connected to the second compensation node EN2, the other end of the third capacitor CAP3 is connected to the third compensation node EN3, and the other end of the fourth capacitor CAP4 is connected to the fourth compensation node EN4, whereby the second to fourth capacitors CAP2, CAP3, and CAP4 may store charges based on the second to fourth compensation voltages $VEQ_P$, $VEQ_{CM}$, and $VEQ_N$ of the second to fourth compensation nodes EN2, EN3, and EN4 respectively connected thereto.

Figure 16:
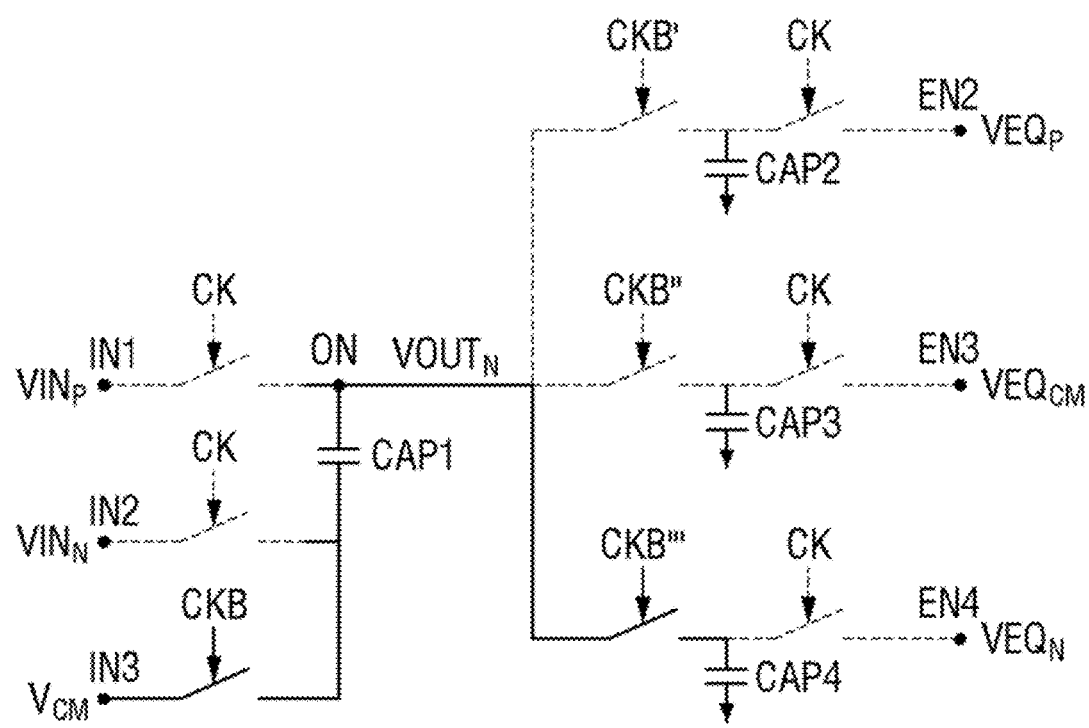
FIG. 16 is an example circuit diagram illustrating amplification and compensation operations of an amplifier and an adder.

FIG. 16 is an example circuit diagram illustrating amplification and compensation operations of an amplifier and an adder.

Referring to FIG. 16, when the internal operating clock is the second clock level CKB, one end of the first capacitor CAP1 of the amplifier is opened to be connected to only the output node ON, and the other end of the first capacitor CAP1 is connected to the third input node IN3 to receive a common voltage, whereby the first capacitor CAP1 may amplify amplitude of an output voltage $VOUT_P$.

Also, only one of one ends of the second to fourth capacitors CAP2, CAP3, and CAP4 of the adder is connected to the output node ON of the amplifier and the other ends of the second to fourth capacitors CAP2, CAP3, and CAP4 are all opened, whereby any one of the second to fourth capacitors CAP2, CAP3, and CAP4 connected to the output node ON of the amplifier may be supplied with the charges stored in the amplifier to output the output voltage $VOUT_P$.

Referring to FIGS. 9 and 16, only one of one ends of the second to fourth capacitors CAP2, CAP3, and CAP4 may be connected to the output node ON through the comparison values Samp_P and Samp_N received from the sampler 223. In detail, the sampler 223 may receive the internal operating clock CK from the clock network 225, and may provide a signal, which allows only one of one ends of the second to fourth capacitors CAP2, CAP3, and CAP4 of the adder to be connected to the output node ON, to the decision feedback equalizer 222 by using the received internal operating clock CK.

For example, when data immediately before the output signal is a signal having a voltage level of a high level and a subsequent signal has a voltage level of a low level, the signal of the high level acts as a post-cursor component, whereby distortion may occur in the signal of the low level. Therefore, the sampler 223 may provide a signal, which allows the fourth capacitor CAP4 of the adder to be connected to the output node ON, to the decision feedback equalizer, such that the output signal of the low level may be compensated.

Figure 17:
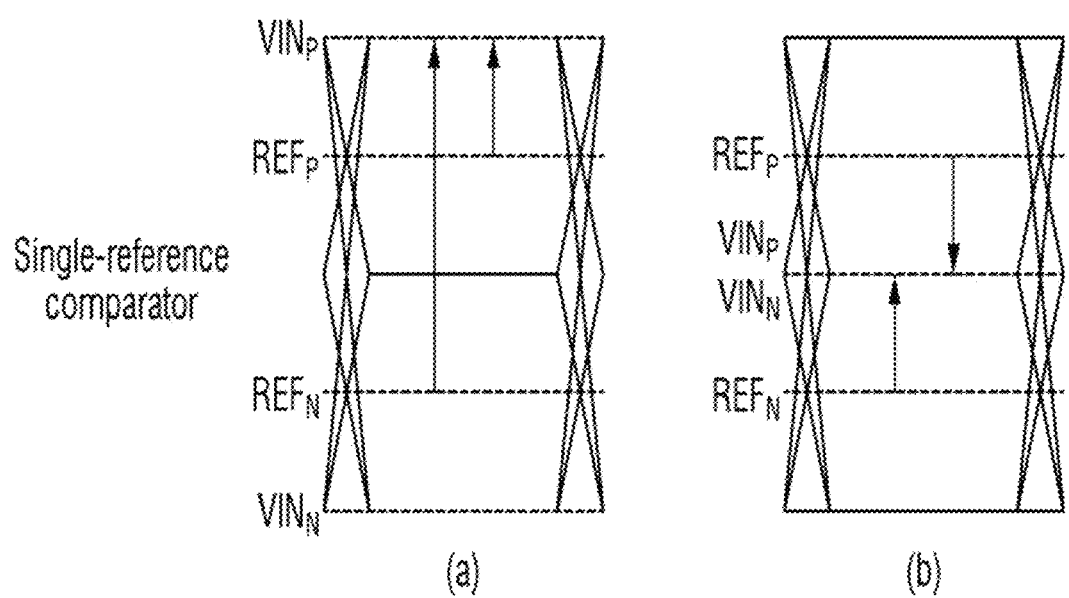
FIG. 17 is a diagram of a method of comparing a reference voltage with an output voltage of a sampler according to an example embodiment.

FIG. 17 is a diagram of a method of comparing a reference voltage with an output voltage of a sampler according to an example embodiment.

Referring to FIG. 17, the sampler 223 may include a single-reference comparator.

The sampler 223 may compare any one of the differential pair of the output voltages $VIN_P$, and $VIN_N$ with each of the differential pair of the reference voltages $REF_P$ and $REF_N$, to output a comparison value.

In detail, when the voltage level of any one $VIN_P$ of the differential pair of the output voltages in (a) of FIG. 17 is a high level, the sampler 223 may compare any one $VIN_P$ of the differential pair of the output voltages having a high level with each of the differential pair of the reference voltages, to output a comparison value.

In detail, when the voltage level of any one $VIN_P$ of the differential pair of the output voltages in (b) of FIG. 17 is a mid level, the sampler 223 may compare one of the differential pair of the output voltages having a mid level with each of the differential pair of the reference voltages, to output a comparison value.

Figure 18:
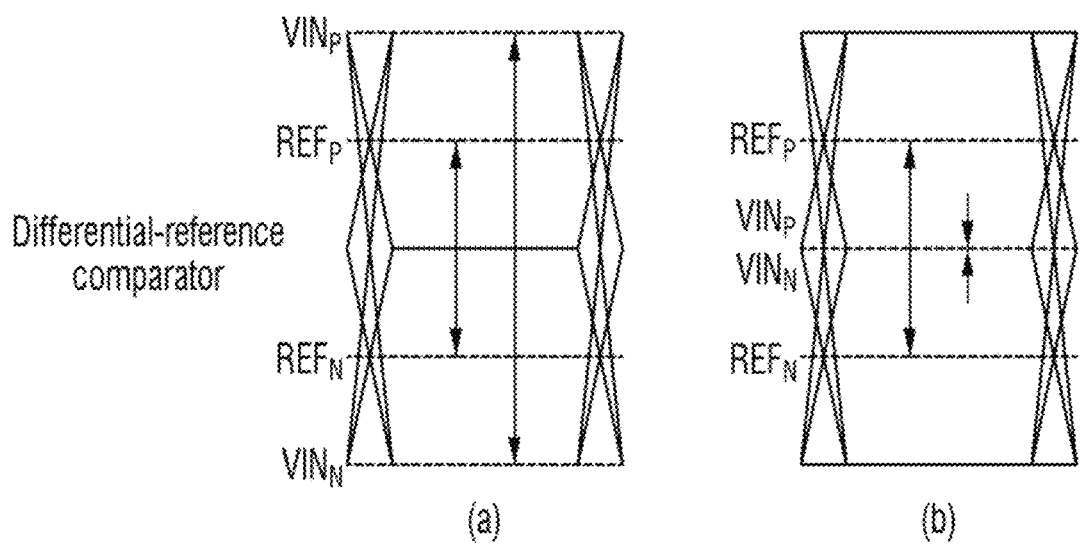
FIG. 18 is a diagram illustrating a method of comparing a reference voltage with an output voltage of a sampler according to another example embodiment.

FIG. 18 is a diagram illustrating a method of comparing a reference voltage with an output voltage of a sampler according to another example embodiment.

Referring to FIG. 18, the sampler 223 may include a differential-reference comparator.

The sampler 223 may output a comparison value by comparing a difference between the output voltages $VIN_P$ and $VIN_N$ with a difference between the reference voltages $REF_P$ and $REF_N$.

In detail, in (a) of FIG. 18, when a voltage level of any one $VIN_P$ of the differential pair of the output voltages is a high level, a voltage level of the other one $VIN_N$ may be a low level, and the sampler 223 may compare the difference between the output voltages $VIN_P$ and $VIN_N$ with the difference between the reference voltages $REF_P$ and $REF_N$, to output a comparison value.

In detail, in (b) of FIG. 18, when the voltage level of any one $VIN_P$ of the differential pair of the output voltages is a mid level, the voltage level of the other one $VIN_N$ may be a mid level, and the sampler 223 may compare the difference between the output voltages $VIN_P$ and $VIN_N$ with the difference between the reference voltages $REF_P$ and $REF_N$, to output a comparison value.

The case in which the difference between the output voltages $VIN_P$ and $VIN_N$ is compared with the difference between the reference voltages $REF_P$ and $REF_N$ may have a larger margin, relative to the case in which any one of the differential pair of the output voltages is compared with each of the differential pair of the reference voltages. In detail, the case in which the difference between the output voltages $VIN_P$ and $VIN_N$ is compared with the difference between the reference voltages $REF_P$ and $REF_N$ in (a) and (b) of FIG. 18 may have a voltage margin of twice as compared with the case in which $VIN_P$ is compared with $REF_P$ in (a) and (b) of FIG. 17.

FIG. 19 is an example table illustrating a method of demodulating a data signal in a demodulator by using a comparison value of a sampler.

Referring to FIG. 19, for an example in which the sampler 223 includes a single reference comparator of FIG. 17, when a voltage level of any one $V_{OUT\_P}$ of a differential pair of output voltages $V_{OUT\_P}$ and $V_{OUT\_N}$ is a high level, since the voltage level is higher than each of the differential pair of the reference voltages $REF_P$ and $REF_N$, a comparison value Output_samp may be output as "11", as shown in FIG. 19. Also, the demodulator 230 may receive the comparison value to recover a data signal having a voltage level of a high level. Thus, the demodulator 230 may recover information on the comparison value Output_samp of 2 bits to one data signal.

When the voltage level of any one $V_{OUT\_P}$ of the differential pair of the output voltages $V_{OUT\_P}$ and $V_{OUT\_N}$ is a mid level, since the corresponding output voltage has a voltage level higher than that of any one of the differential pair of the reference voltages $REF_P$ and $REF_N$ but has a voltage level lower than that of the other one of the differential pair of the reference voltages $REF_P$ and $REF_N$, the comparison value Output_samp may be output as "01". The demodulator 230 may convert the received comparison value into a data signal for a comparison value immediately before the received comparison value.

When the voltage level of any one $V_{OUT\_P}$ of the differential pair of the output voltages $V_{OUT\_P}$ and $V_{OUT\_N}$ is a low level, since the corresponding output voltage has a voltage level lower than that of each of the differential pair of the reference voltages $REF_P$ and $REF_N$, the comparison value Output_samp may be output as "00". The demodulator 230 may receive the comparison value to recover a data signal having a voltage level of a low level.

Figure 20:
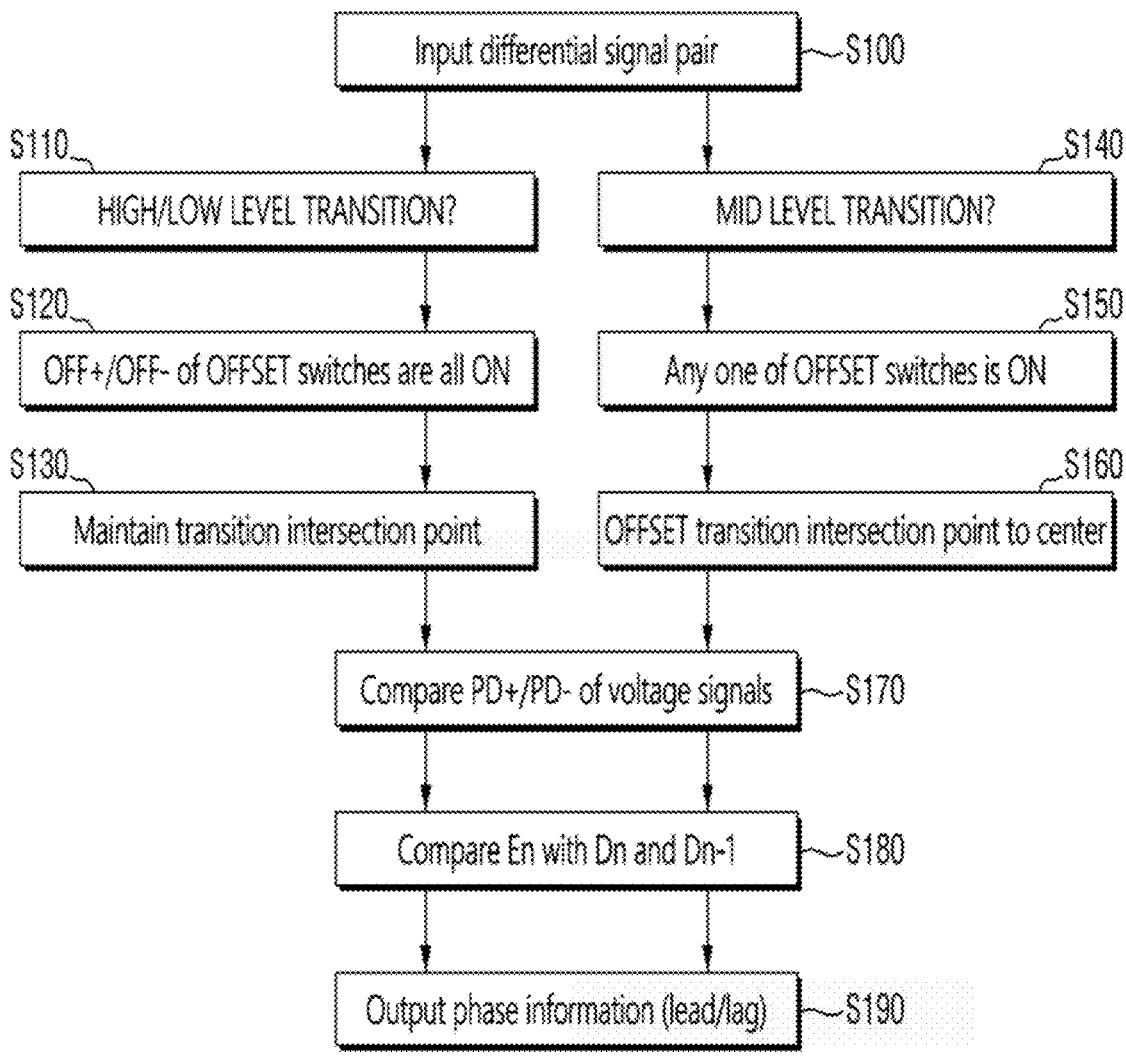
FIG. 20 is an example flow chart illustrating a method of operating the phase detector of FIG. 11.

FIG. 20 is an example flow chart illustrating a method of operating the phase detector of FIG. 11, and FIGS. 21 to 24 are example diagrams illustrating a method of operating the phase detector of FIG. 11.

Figure 21:
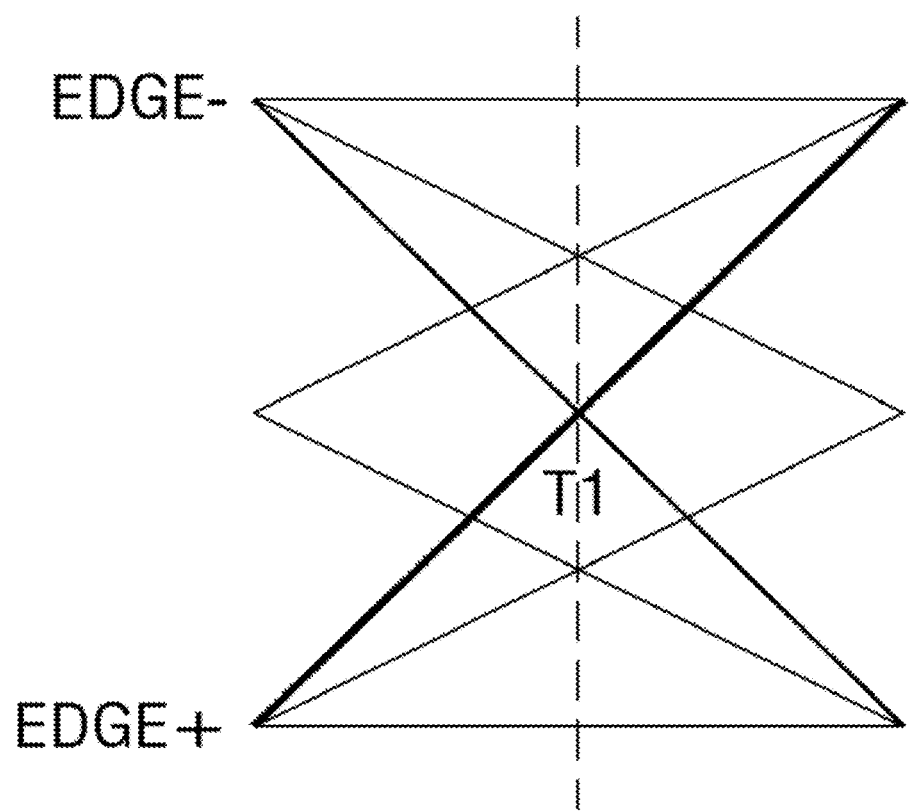
FIGS. 21 to 24 are example diagrams illustrating a method of operating the phase detector of FIG. 11.

Referring to FIGS. 11 and 20 to 24, the phase detector 224 of FIG. 20 receives output voltages Edge_P and Edge_N of a differential signal pair from the edge decision feedback equalizer 227 (S100). As shown in FIG. 21, when a voltage level of output voltages that are input is transited from a high level to a low level or vice versa (S110), since an intersection point T1 based on voltage level transition is positioned at the center, the first offset switch 228 and the second offset switch 229 of the offset switch in FIG. 11 may all be turned ON (S120). Therefore, the position of the intersection point T1 based on the voltage level transition may be maintained at the center (S130).

Figure 22:
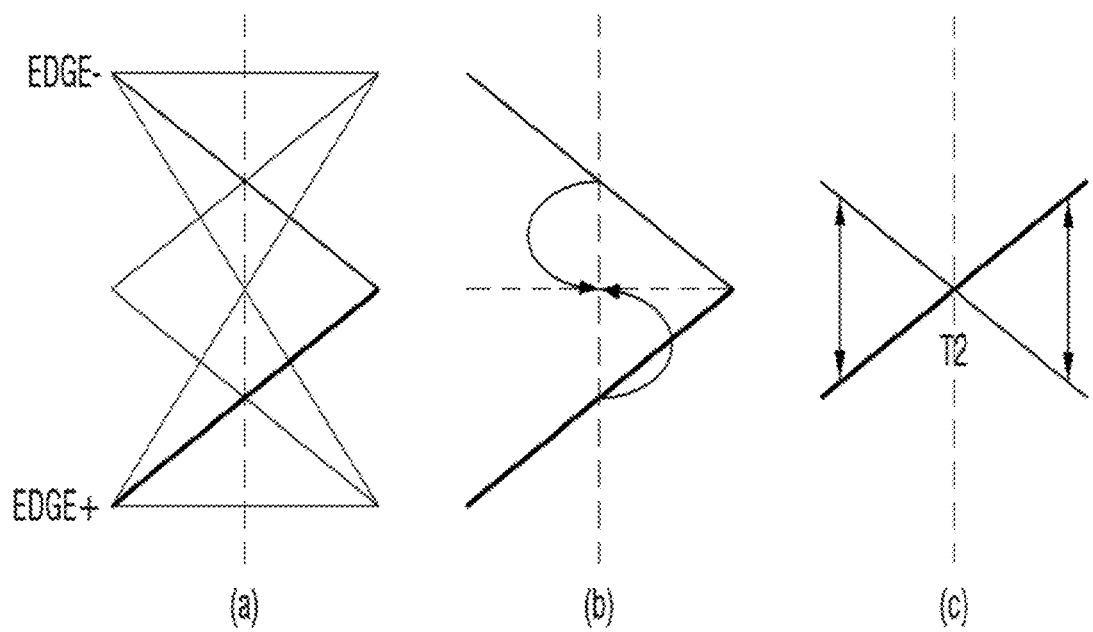

On the other hand, as shown in (a) of FIG. 22, when the voltage level of the output voltages that are input is transited from a high level to a mid level or from a low level to a mid level (S140), since the intersection point based on the voltage level transition is not positioned at the center, only one of the first offset switch 228 and the second offset switch 229 of the offset switch in FIG. 11 may be turned ON (S150). Therefore, the intersection point T2 based on the voltage level transition may be corrected to be positioned at the center (S160).

The phase detector 224 may include a phase comparator. The phase comparator may include a comparator for determining whether the intersection point generated by the voltage level transition of the output voltage Edge_P and the Edge_N has been positioned at the center. The comparator may compare magnitudes of voltage signals PD+ and PD− generated by the offset switch and the edge decision feedback equalizer in FIG. 11, to determine whether the position of the intersection point generated by the voltage level transition has been positioned at the center (S170).

The phase detector 224 may generate edge information $E_n$ on the phase of the intersection point corrected by the offset switch and positioned at the center. The phase detector 224 may generate first data information $D_n$ and second data information $D_{n-1}$ based on the comparison values Data_P and Data_N received from the sampler 223. The edge information $E_n$ may be information on the phase of the intersection point generated by the voltage level transition of the first data information $D_n$ and the second data information $D_{n-1}$. Thus, the first data information $D_n$ and the second data information $D_{n-1}$ may have their respective voltage levels different from each other. The phase comparator may include a logic circuit such as an XOR Logic Gate that compares the edge information $E_n$ with the data information $D_n$ and $D_{n-1}$. The phase comparator may compare the voltage level of the edge information $E_n$ with the voltage level of the data information $D_n$ and $D_{n-1}$ (S180).

The phase detector 224 may compare the voltage level of the edge information $E_n$ with the voltage level of the data information $D_n$ and $D_{n-1}$, to output phase information PI on a phase relationship between the received data signal and the received clock signal (S190).

Figure 23:
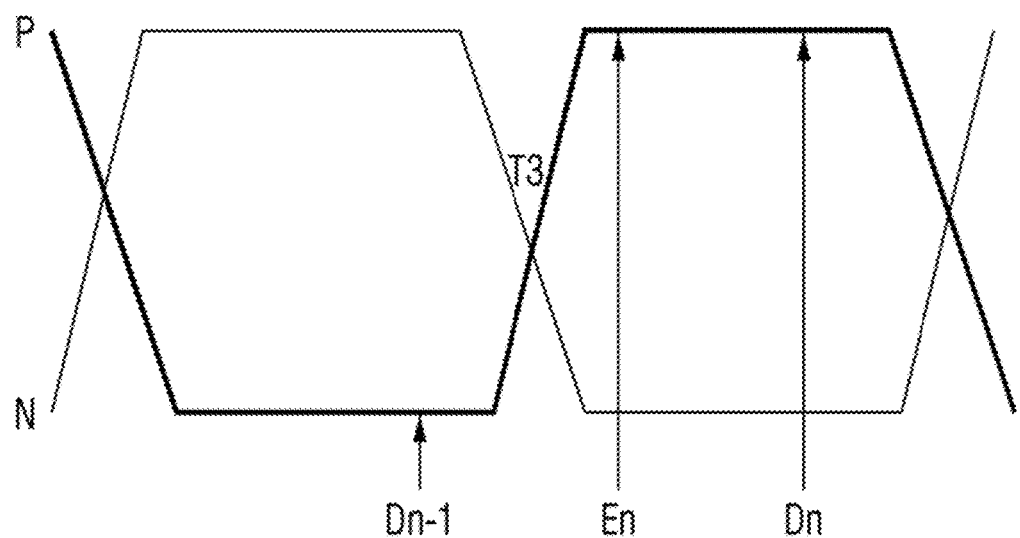

In detail, referring to FIG. 23, signals P and N may be output signals of a differential pair transmitted from the transmitter. In FIG. 23, T3 may indicate the position of the intersection point based on the voltage level transition of the output signal transmitted from the transmitter. Thus, T3 may correspond to a phase of the clock signal embedded in the output signal. When the voltage level of the edge information $E_n$ generated by the phase detector is equal to the voltage level of the first data information $D_n$, since the clock recovered by the receiver is earlier than the phase of the clock signal transmitted from the transmitter, the phase detector may output phase information of clock lag.

Figure 24:
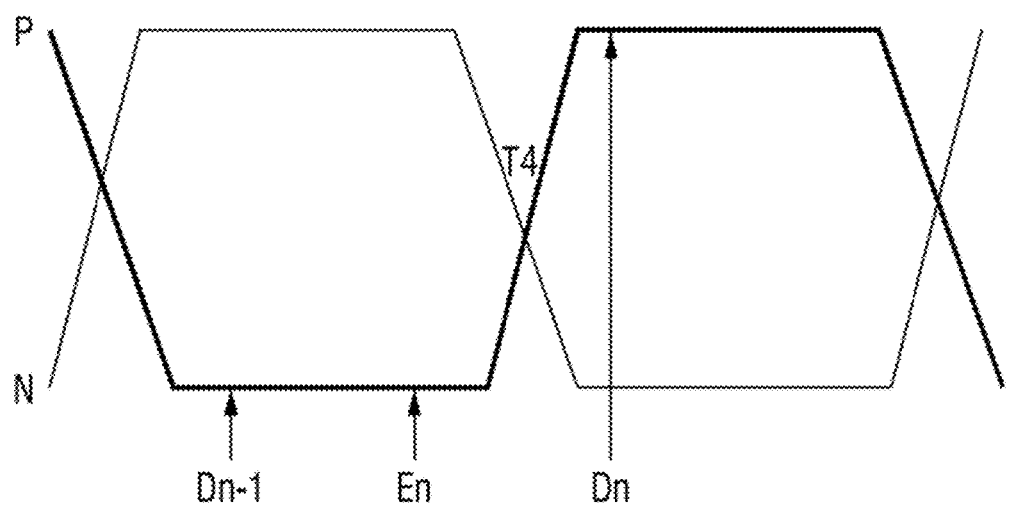

In detail, referring to FIG. 24, signals P and N may be output signals of a differential pair transmitted from the transmitter. In FIG. 24, T4 may indicate the position of the intersection point based on the voltage level transition of the output signal transmitted from the transmitter. Thus, T4 may correspond to the phase of the clock signal embedded in the output signal. When the voltage level of the edge information $E_n$ generated by the phase detector is equal to the voltage level of the second data information $D_{n-1}$, since the clock recovered by the receiver is lag behind the phase of the clock signal transmitted from the transmitter, the phase detector may output phase information of clock lead.

By way of summation and review, in an NRZ (PAM-2) signaling method, since only data of 1 bit may be transmitted during a unit interval (UI), there may be a limitation in enhancing a clock frequency. Since the NRZ (PAM-2) signaling method is affected by a channel during high-speed data transmission, it may be difficult to implement a high-speed transceiver. In addition, in a clock embedding method of a general 8B/10B encoding scheme, two dummy symbols are inserted every ten symbols to ensure a data transition density of at least 20%, whereby a clock signal may be embedded in a data signal. However, the two dummy symbols may not have data information, reducing bit efficiency. Meanwhile, since a decision feedback equalizer (DFE) included in a receiver may use a current source, a decision feedback equalizer may not be applied to a low power system due to the presence of power consumption caused by fixed current consumption.

As described above, embodiments relate to a data transmitting and receiving device that includes a transmitter for modulating a continuous voltage level value of a data signal to a mid-level based on three-level signaling, and performing modulation to embed a clock signal in the data signal, and a receiver including a phase detector for adjusting a position of an intersection point based on voltage level transition of a signal to recover a clock from a received signal and a charge sharing type decision feedback equalizer.

Embodiments may provide a transmitter that facilitates clock recovery and enables reliable three-level signaling communication, a receiver that may be applied to a low power system due to no additional power consumption, and a receiver that may easily recover a clock from a received signal.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A transmitter, comprising:
a processing unit configured to receive a clock signal and a data signal, set a value of a consecutive identical digit (CID) value related to the data signal and generate a modulation signal during a unit interval (UI) based on the data signal and the CID value; and
a transmitter driver configured to output output signals having different voltage levels during the UI by receiving the modulation signal.

2. The transmitter as claimed in claim 1, wherein the voltage levels of the output signals include a high level, a mid level and a low level.

3. The transmitter as claimed in claim 2, wherein the CID value is N, in which N is a natural number of 3 or more, and the processing unit is configured to generate the modulation signal for outputting an Nth signal as the output signal of the mid level when the CID is repeated N times.

4. The transmitter as claimed in claim 3, wherein:
the modulation signal has an on or off value,
the transmitter driver includes first and second output terminals, and
the first and second output terminals output the output signal based on a value of the modulation signal as a single-ended signal or differential signal.

5. The transmitter as claimed in claim 4, wherein the modulation signal includes first and second modulation signals,
when a value of the first modulation signal is ON and a value of the second modulation signal is OFF, the first output terminal is configured to output the output signal of the high level and the second output terminal is configured to output the output signal of the low level,
when the value of the first modulation signal is ON and the value of the second modulation signal is ON, the first output terminal is configured to output the output signal of the mid level and the second output terminal is configured to output the output signal of the mid level, and
when the value of the first modulation signal is OFF and the value of the second modulation signal is ON, the first output terminal is configured to output the output signal of the low level and the second output terminal is configured to output the output signal of the high level.

6. The transmitter as claimed in claim 4, wherein the modulation signal includes first to third modulation signals,
when a value of the first modulation signal is ON, a value of the second modulation signal is OFF and a value of the third modulation signal is OFF, the first output terminal is configured to output the output signal of the high level and the second output terminal is configured to output the output signal of the low level,
when the value of the first modulation signal is OFF, the value of the second modulation signal is ON and the value of the third modulation signal is OFF, the first output terminal is configured to output the output signal of the low level and the second output terminal is configured to output the output signal of the high level, and when the value of the first modulation signal is OFF, the value of the second modulation signal is OFF and the value of the third modulation signal is ON, the first output terminal is configured to output the output signal of the mid level and the second output terminal is configured to output the output signal of the mid level.

7. A data transceiving system, comprising:
a transmitter configured to receive a clock signal and a data signal and output output signals based on the clock signal and the data signal; and
a receiver configured to receive the output signals and recover the clock signal and the data signal based on the output signals,
wherein the transmitter includes:
a processing unit configured to receive a clock signal and a data signal, set a value of a consecutive identical digit (CID) value related to the data signal and generate a modulation signal during a unit interval (UI) based on the data signal and the CID value; and
a transmitter driver configured to output output signals having different voltage levels during the UI by receiving the modulation signal,
wherein the receiver includes:
an input unit configured to receive and amplify the output signals to output recovery voltages; and
a clock-data recovery (CDR) unit configured to receive the recovery voltages to recover the clock signal and the data signal.

8. The data transceiving system as claimed in claim 7, wherein the CDR unit includes:
a decision feedback equalizer (DFE); and
a clock network configured to provide an internal operating clock to the DFE, and the DFE includes:
an amplifier configured to amplify amplitude of output voltages based on the recovery voltages; and
an adder connected to an output node of the amplifier to receive charges stored in the amplifier, compensating for a channel loss of the output voltages of the output node.

9. The data transceiving system as claimed in claim 8, wherein:
the recovery voltages include a differential pair voltage generated based on the output signals and a common voltage that is a common signal of the differential pair voltage,
the amplifier includes a first capacitor,
one end of the first capacitor is connected to the output node, and is connected to a first input node in accordance with the internal operating clock to receive any one of a differential pair of the recovery voltages, and
the other end of the first capacitor is connected to a second input node in accordance with the internal operating clock to receive the other one of the differential pair of the recovery voltages, or is connected to a third input node to receive the common voltage.

10. The data transceiving system as claimed in claim 9, wherein the internal operating clock performs transition between a first clock level and a second clock level,
in response to the internal operating clock that is the first clock level, one end of the first capacitor is connected to the first input node to receive any one of the differential pair of the recovery voltages and the other end of the first capacitor is connected to the second input node to receive the other one of the differential pair of the recovery voltages to allow the first capacitor to store charges based on the recovery voltages, and in response to the internal operating clock that is the second clock level, one end of the first capacitor is opened to be connected to only the output node and the other end of the first capacitor is connected to the third input node to receive the common voltage to allow the first capacitor to amplify the amplitude of the output voltage and output the amplified amplitude to the output node.

11. The data transceiving system as claimed in claim 8, wherein:
the adder includes second to fourth capacitors,
any one of one ends of the second to fourth capacitors is connected to an output node of the amplifier in accordance with the internal operating clock,
the other end of the second capacitor is connected to a second compensation node in accordance with the internal operating clock,
the other end of the third capacitor is connected to a third compensation node in accordance with the internal operating clock, and
the other end of the fourth capacitor is connected to a fourth compensation node in accordance with the internal operating clock.

12. The data transceiving system as claimed in claim 11, wherein the internal operating clock performs transition between a first clock level and a second clock level,
in response to the internal operating clock that is the first clock level, one ends of the second to fourth capacitors are all opened, the other end of the second capacitor is connected with the second compensation node, the other end of the third capacitor is connected with the third compensation node, the other end of the fourth capacitor is connected with the fourth compensation node to allow the second to fourth capacitors to store charges based on second to fourth compensation voltages of the second to fourth compensation nodes respectively connected thereto, and
in response to the internal operating clock that is the second clock level, only one of one ends of the second to fourth capacitors is connected to the output node of the amplifier and the other ends of the second to fourth capacitors are opened such that any one of the second to fourth capacitors connected to the output node of the amplifier receives the charges stored in the amplifier to output the output voltage.

13. The data transceiving system as claimed in claim 11, wherein the second to fourth capacitors have the same capacitance value.

14. The data transceiving system as claimed in claim 8, wherein the CDR unit further includes:
a reference sampler configured to provide reference voltages of a differential pair for being compared with the output voltages of the differential pair,
a sampler configured to compare the output voltages with the reference voltages to output a comparison value; and
a demodulator configured to convert a comparison value corresponding to the value of the CID value set by the transmitter into data for a comparison value immediately before the comparison value.

15. The data transceiving system as claimed in claim 14, wherein the sampler is configured to output the comparison value by comparing any one of the differential pair of the output voltages with each of the differential pair of the reference voltages.

16. The data transceiving system as claimed in claim 14, wherein the sampler is configured to output the comparison value by comparing a difference between the output voltages with a difference between the reference voltages.

17. The data transceiving system as claimed in claim 7, wherein the CDR unit includes:
- a data decision feedback equalizer (Data DFE);
- an edge decision feedback equalizer (Edge DFE);
- a reference sampler;
- a sampler; and
- a phase detector (PD),
- the sampler is configured to compare an output of the Data DFE with an output of the reference sampler to output a comparison value and provide the comparison value to the PD,
- the Edge DFE is configured to output an output voltage for identifying an intersection point of voltage level transition to provide the output voltage to the PD, and
- the PD is configured to output phase information by adjusting a position of the intersection point based on the comparison value and the output voltage.

18. The data transceiving system as claimed in claim 17, wherein:
- the PD includes an offset switch including a first offset switch and a second offset switch, and
- the offset switch is configured to correct the output voltage such that the intersection point based on voltage level transition of the output voltage is centered.

19. The data transceiving system as claimed in claim 18, wherein the voltage level of the output voltage includes a high level, a mid level and a low level,
- when the voltage level of the output voltage is transited from the high level to the low level or transited from the low level to the high level, the offset switch is turned on, and
- when the voltage level of the output voltage is transited from the high level to the mid level or transited from the low level to the mid level, only one of the first offset switch and the second offset switch is turned on.

20. The data transceiving system as claimed in claim 17, wherein the PD is configured to:
- determine whether the intersection point has been centered, generate first information on a phase of the intersection point, generate second information based on the comparison value, and
- output phase information by comparing a voltage level of the first information with a voltage level of the second information.

* * * * *